J. M. HURD.
Bag-Machines.
No. 5,454. Reissued June 17, 1873.
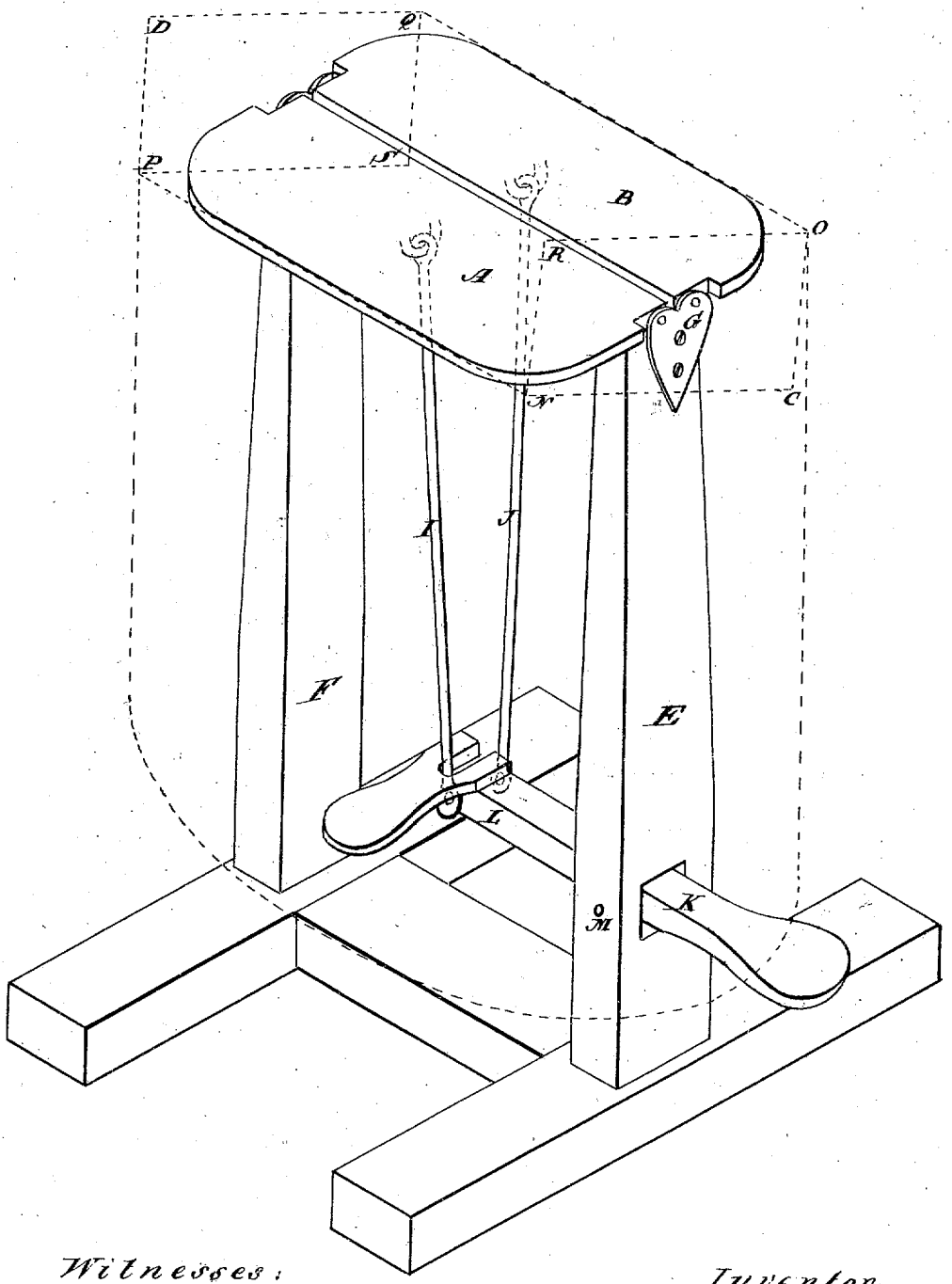
Witnesses:
E. Wolff.
Ed. M. Culley
Inventor:
J. M. Hurd.
By his Attorney
T. J. McIntire
N.Y.

UNITED STATES PATENT OFFICE.

J. M. HURD, OF AUBURN, NEW YORK.

IMPROVEMENT IN BAG-MACHINES.

Specification forming part of Letters Patent No. 43,773, dated August 9, 1864; reissue No. 5,454, dated June 17, 1873; application filed March 25, 1873.

*To all whom it may concern:*

Be it known that I, J. M. HURD, of the city of Auburn, in the county of Cayuga and State of New York, have invented a new and useful Machine or Apparatus to be employed in the Manufacture of Paper-Bags, for effecting the folding or pasting of the square-bottom portion of the bag; and I do hereby declare the following to be a full, clear, and exact description of the same, reference being had to the accompanying drawings and the letters of reference marked thereon.

In the manufacture of paper bags it has been suggested, to overcome the serious objection to the use of the common grocer's bag for flour sacks, &c., presented in the projecting bottom corners, by taking such ordinary grocer's bag—that is, a flattened tube with one mouth or open end simply closed up—and so folding or doubling over and pasting the bottom or closed end as to make the bag present when filled what is known as a square bottom, and Letters Patent were granted to me for this new kind of bag, or mode of converting a common grocer's bag into a square-bottom bag, December 26, 1865. In the manufacture of this kind of square-bottom bag it is necessary, not only to accurately break down and fold over and paste the corners of the bottom, but also to properly reflatten the completed bag, in order that it shall be in a proper condition to be printed on, if desired, and for packing and transportation.

My invention has for its object to provide a machine or contrivance by means of which the operations of folding and pasting to form the square bottom may be facilitated, and at the same time the reflattening of the finished bag may be effected, as will be hereinafter more fully explained.

To enable those skilled in the art to make and use my invention, I will proceed to more fully describe it, referring by letters to the accompanying drawing, in which is illustrated, in perspective view, a machine made in accordance with my invention, and embracing a mode of carrying out the principle thereof, which I have found to operate successfully.

From a suitable base (or from the floor) project upward to a convenient height two standards or supports, E and F, to the upper ends or portions of which are hung, on pivots at G and H, two table-like leaves or planes, A and B. These leaves A B, it will be understood, turn freely upward on their pivots, as if their adjacent edges were hinged together, and when in their normal position are supported in a horizontal plane, as seen in the drawing. Their outer corners may be slightly rounded off, as illustrated, and their functions and operations will be presently more fully explained. I and J are two rods, the upper end of each of which is coupled or connected to the under side of one of the leaves A B, and the lower end to one arm, L, of a lever, which is hung on a shaft or pivot, M, to one of the standards, E, and the other end, K, of which forms a treadle, to be operated as and for purposes to be presently explained.

The dotted lines in the drawing are intended to show the outline or contour of a bag and the manner of shaping or folding over the bottom thereof on the machine or apparatus, which operation may be thus described.

Supposing the leaves A B to be closed up into a nearly vertical position, the bag, made after the fashion of an ordinary grocer's bag, is slightly opened at its mouth, and is pulled down over the leaves A B, which latter are then allowed to fall, or are forced, down into the horizontal position shown in the drawing, the bag being distended over them or the table thus formed, and surrounding the frame of the machine, while its corners project, as indicated at C D. The operative now properly applies the paste to those parts of the flattened-out or distended bottom portion which are embraced, respectively, between the points N O C and P Q D, and then folds these corner portions over onto the portions included, respectively, between the points N O R and P Q S, and securely pastes them thereto, the table leaves A B serving as the supporting-surface of the stock in the performance of this operation, and also as the former for determining the lines of the folds thus made and the contour and size of the square bottom produced by folding over and pasting, as described, the corner portions of the bag.

It will be seen that, after having folded over and pasted the corner portions of the bottom, as explained, the bottom of the bag will about correspond in shape or contour to the perimeter of the plane or table, composed of the horizontally-placed leaves A B, and that the body of the bag will assume comparatively the same shape in cross-section. The bag having now been completely formed on the table, the operative, while holding down with his thumb and fingers the folded over and pasted corners near the points R and S, puts his foot on the treadle K, and, pressing it down, raises the end L of the lever, to which the lower ends of the two rods I and J are connected. By this movement of the said lever and rods the leaves A B of the supporting-table or plane are again folded upward and together, turning on their pivots at G H, clamping and folding in between them the bag-bottom, which is thus creased and flattened into the proper condition. The operative withdraws upward from the machine the finished and flattened bag, which, it will be seen, will be in the most desirable condition for printing, packing, &c. While the foot of the operative is on the treadle another sack is placed over the leaves, which are again brought into the proper horizontal position for the performance of the pasting and folding, and so on.

It will be seen that, by the use of a machine constructed and operating upon the principle of my invention, I am enabled, not only to quickly and properly fold over and paste the bottom corners for converting the common closed ends of the paper tubes into square-bottom bags, but also to fold up or reflatten the finished bags before they are withdrawn from the folding table and former; and it will be understood that this characteristic feature of my machine or contrivance may be employed with advantage in the making of all sorts of square-bottom bags, from various kinds of flattened tubes.

The details of construction of the machine, as well as its size and proportions, may, of course, be infinitely varied without departing from the spirit of my invention, the gist of which will be seen to rest in the idea of a supporting-surface on which to fold and paste the bag-bottom, which serves as a former to give shape to the bottom, and by means of which the finished bottom may be creased and flattened, as hereinbefore set forth.

Having so fully explained the principle and operation of my new machine or apparatus as to enable any one skilled to make and use a machine embodying my invention, what I claim as new, and desire to secure by Letters Patent, is—

A machine or apparatus having a suitable supporting and former surface, which may be folded or closed up to flatten the finished bag, substantially as and for the purposes set forth.

In testimony whereof I have hereunto set my hand and seal this 12th day of March, 1873.

J. M. HURD. [L. S.]

In presence of—
JAMES LYON,
T. J. SEARLS.